United States Patent [19]

Pulley et al.

[11] Patent Number: 5,512,388

[45] Date of Patent: Apr. 30, 1996

[54] SIDE COVER BATTERY CELL ASSEMBLY

[75] Inventors: Christopher J. Pulley, Shaker Hts.; Steven J. Specht, Concord; Geoffrey Barlow, South Russell, all of Ohio

[73] Assignee: Westinghouse Electric Corporation, Pittsburgh, Pa.

[21] Appl. No.: 323,979

[22] Filed: Oct. 17, 1994

[51] Int. Cl.$^6$ .............................. H01M 2/06; H01M 2/04
[52] U.S. Cl. ...................... 429/179; 429/177; 429/153; 429/152
[58] Field of Search ...................... 429/176, 177, 429/179, 152, 153, 157, 112, 221

[56] References Cited

U.S. PATENT DOCUMENTS

| | | | |
|---|---|---|---|
| 3,947,291 | 3/1976 | Yao et al. | 429/221 |
| 4,189,529 | 2/1980 | Birt et al. | 429/112 |
| 4,891,048 | 1/1990 | Kummel et al. | 429/152 |
| 5,114,807 | 5/1992 | Rowlette | 429/179 |
| 5,288,565 | 2/1994 | Gruenstern | 429/152 |

*Primary Examiner*—Stephen Kalafut
*Assistant Examiner*—Carol Chaney

[57] ABSTRACT

An improved case is provided for a lithium/metal sulfide battery. The improved case is arranged such that the largest surface, corresponding to the side of a traditional cell case, is left open. The remaining five sides of the case can be formed in a drawn form from a single sheet of metal. The electrode plates can be provided within this drawn case and a cover can then be welded to the case to form the cell assembly. Utilizing the side of the cell case rather than the top of the cell case provides easier handling and installation of the electrode plates within the cell case.

2 Claims, 3 Drawing Sheets

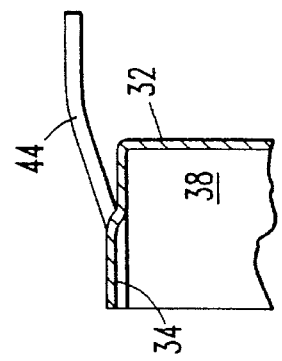
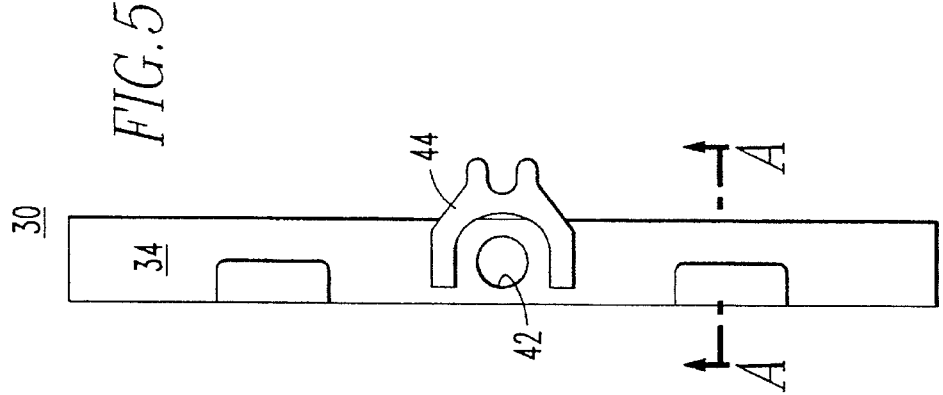
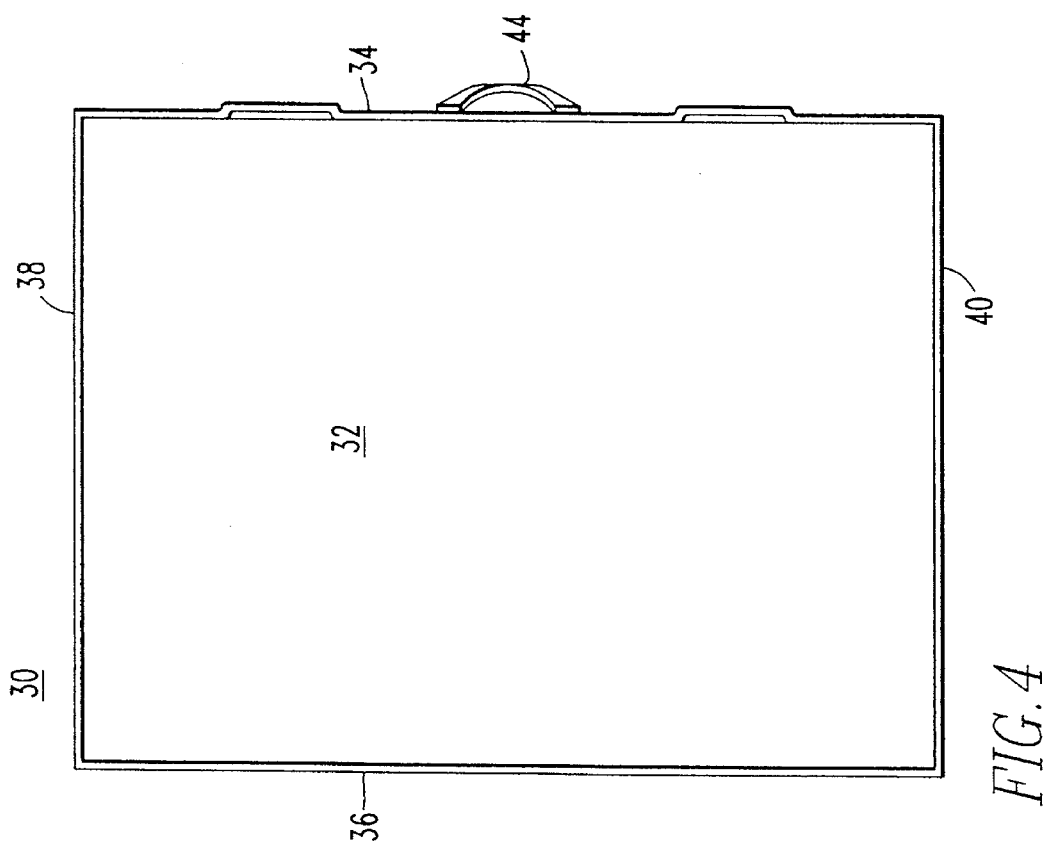

_5,512,388_

SIDE COVER BATTERY CELL ASSEMBLY

BACKGROUND OF THE INVENTION

1. Field of the Invention

This invention relates to a cell assembly for a lithium/metal sulfide battery, and, more particularly, to an improved case for the cell assembly.

2. Description of the Prior Art

Lithium/metal sulfide batteries are becoming increasingly desirable based on their ability to provide high power and energy performance at generally low cost. Such lithium/metal sulfide batteries are typically provided in a cell assembly in which there is at least one positive electrode, one negative electrode and a separator within a can, or case. A typical case for a lithium/metal sulfide cell assembly is shown in FIGS. 1–3, the front, top and side elevational views of the case.

As shown in FIGS. 1–3, the case 10 for a typical lithium/metal sulfide cell assembly has a height 12 and length 14 substantially greater than its width 16. In assembling the cell, the top of the cell is left open and the electrode plates and separator are inserted therein. The electrode plates have a shape similar to the case 10 of the cell assembly. Once the electrode plates are inserted into the case 10, a cover is provided on top of case 10 and is welded thereto.

Because of the shape of case 10, case 10 must be formed of two separate pieces 18 and 20 which are joined at weld line 22. Because of the narrow and deep configuration of case 10, the case cannot be drawn. Rather, case 10 must be manufactured in two halves.

In addition to being difficult to manufacture, traditional prior art cases 10 are also difficult to use during assembly of the battery cell. As previously stated, the electrodes are loaded into case 10 through the top of the case. This requires a compressive load prior to and during the installation of the electrode stack into the case 10. Applying a compressive and sliding load to the electrode plates and separator can result in cracking of the electrodes and separator, as well as cause contamination between the electrodes, thereby potentially developing a short between the electrodes which ultimately causes the cell to fail. Because the electrodes are approximately 100 times taller and 150 times wider than they are thick, the electrodes are difficult to handle without breaking while applying a load to their edge. The electrodes are installed into metal frames at additional cost to protect them from cracking during assembly. Accordingly, there is a need for a low cost cell assembly which provides ease of handling during assembly of the cell.

Side cover battery cases have been used in the past in connection with plastic cases for ambient temperature battery cells. These battery cells are flooded electrolyte systems. In such ambient temperature cells, compression of the electrodes is not as critical as it is in high temperature lithium/metal sulfide battery cells. The need for the compressive load on the electrode stack is not an issue with such ambient temperature battery cells housed in plastic cases.

SUMMARY OF THE INVENTION

A case for a lithium/metal sulfide battery is provided in which one of the side surfaces forms the cover of the case or the cover forms one side and one edge. In such an arrangement, the case can be deep drawn to form the four or five sides. In this manner, the case can be manufactured at low cost and with great ease.

Moreover, the electrodes and separator can be loaded into the case from the side of the cell case. In such an installation, only a compressive load is placed on the electrode stack. Frames for the negative electrodes can be potentially eliminated and a current collector can be added for the center negative electrodes in the five plate cell design. The high cost molybdenum frames for the positive electrodes are replaced with a lower cost flexible graphite frame or gasket. Edge insulators around the circumference of the electrodes support the electrodes.

BRIEF DESCRIPTION OF THE DRAWINGS

FIG. 4 is a view looking into a presently preferred embodiment of the case for the battery cell assembly of the present invention.

FIG. 5 is a view of top of the case of FIG. 4.

FIG. 6 is a cross sectional view of the top of the case taken along line A—A of FIG. 5.

DETAILED DESCRIPTION OF THE PREFERRED EMBODIMENTS

Figures 1, 2, 3:
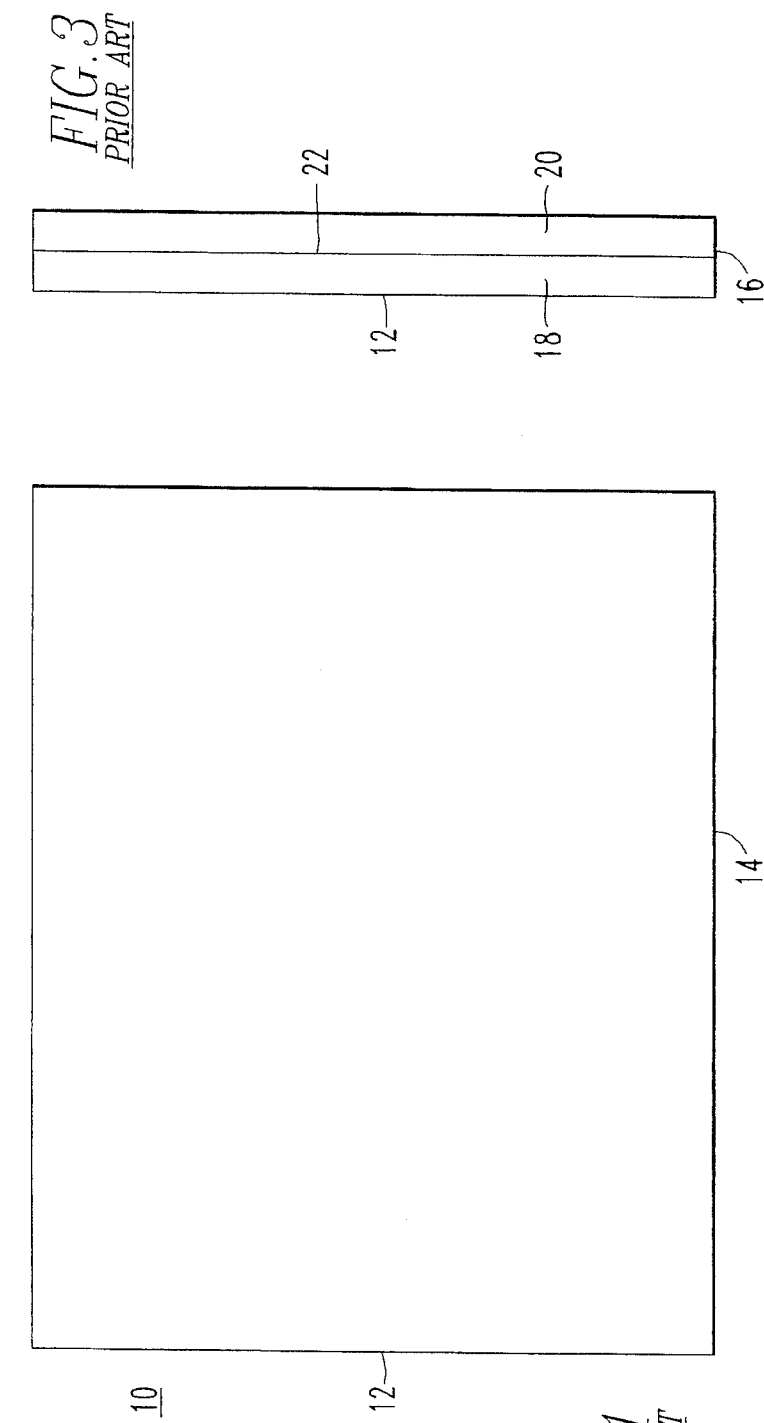
FIG. 1 is a front elevational view of a cell case from the prior art.
FIG. 2 is a top elevational view of the cell case of FIG. 1.
FIG. 3 is an end elevational view of the cell case of FIG. 1.

A case 30 for a battery cell assembly is provided in which the largest surface of the case 30 is left open. FIG. 4 is a top view of the case 30 of the present invention showing case back side 32 bounded by top 34, bottom 36 and ends 38 and 40. Unlike prior art case 10, case 30 can be drawn and is thus easy to manufacture.

Top 34 of case 30 is adapted to serve the same purpose as the cover of prior art case 10. For this purpose, a hole 42 is provided in the center of top 34 to provide space for the positive terminal stud to extend from within case 30 to an exterior position. An intercell connector 44 is also provided on top 34 and is used to connect the cell within case 30 to the positive terminal of the adjacent cell.

In case 10, the electrodes had to be loaded through the top of the cell case. This required the electrodes to be under a compressive load and a sliding load. By allowing the electrodes to be loaded into the side of the cell case 30 in the present invention, the only load applied on the electrode stack is a compressive load. This minimizes the cracking of the electrodes and separators while loading. Changing the cell case 30 to side loading also eliminates the need for framing both the positive and negative electrodes to add strength for loading. Framing is only required to restrict the active materials and can be accomplished using less expensive materials such as flexible graphite frames around the positive electrode. An example of such flexible graphite is sold by Union Carbide under the trademark GRAFOIL. Moreover, loading the electrodes from the side of the can will be easier to automate for high-rate production.

In cell case 10, high-cost molybdenum frames were needed for framing the positive electrodes. In case 30, these expensive frames have been replaced with lower cost flexible graphite frames or gaskets. Edge insulators provided around circumference of the electrodes support the electrodes to restrict the flow of active material during cell operation. There is no need for metal frames which were required for use in case 10.

Figure 7:
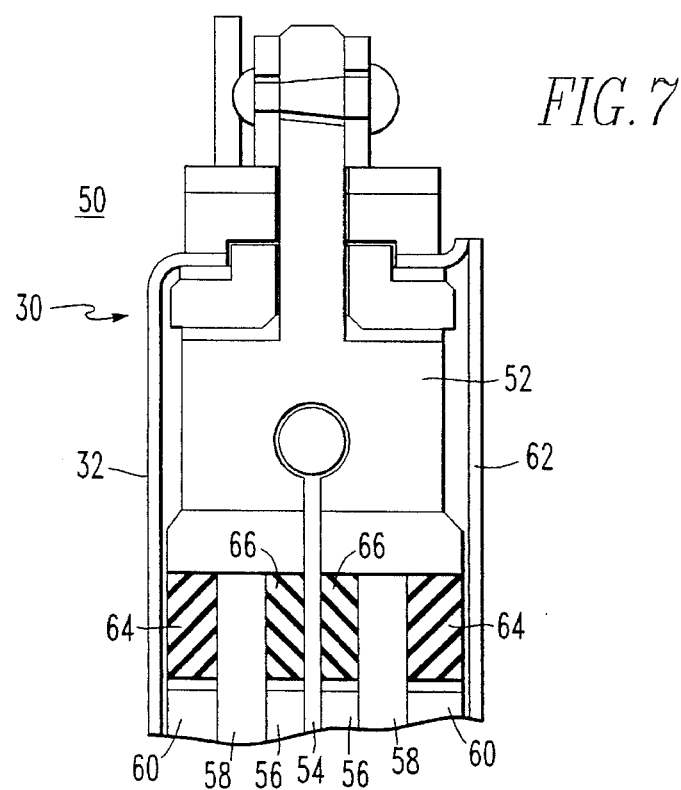
FIG. 7 is a schematic view of a cell assembly using the case of FIG. 4.

Loading the electrode plates into cell case 30 can best be illustrated with reference to FIG. 7. FIG. 7 shows a typical three-plate cell assembly 50 utilizing case 30. Cell assembly 50 includes positive terminal 52 from which positive current collector 54 descends into the body of the cell. A positive electrode 56 is provided on either side of positive current collector 54. A separator 58 is provided adjacent each positive electrode 56 and separates positive electrode 56 from negative electrode 60. The negative electrodes 60 abut the back side 32 and the cover 62 of case 30. Framing elements 64 and 66 are provided adjacent the negative electrodes 60 and positive electrodes 56, respectively, to restrict lateral movement within the cell assembly 50.

One advantage of using the side cover case 30 is that the electrodes can be inserted into the case 30 by stacking the individual plates separately within the case. The electrode stack does not have to be preassembled and precompressed for insertion into case 30. Rather, the plates and framing elements can be inserted sequentially beginning with the negative electrode framing element 64 and negative electrodes 60 which abut the back side 32 of case 30 and ending with the negative electrode 60 and negative electrode framing element 64 which abut cover 62 of case 30.

Preferably, positive electrode framing elements 66 are formed from flexible graphite material. Negative electrode framing elements 64 can be formed from flexible graphite. Alternatively, negative electrode framing elements 64 can also be formed from steel since those framing elements 64 contact negative electrode 60. Positive current collector 54 is preferably formed from molybdenum. However, positive current collector 54 can also be formed from flexible graphite. In such case, positive electrode framing elements 66 can be formed as part of positive current collector 54 or otherwise bonded thereto if desired.

Figure 8:
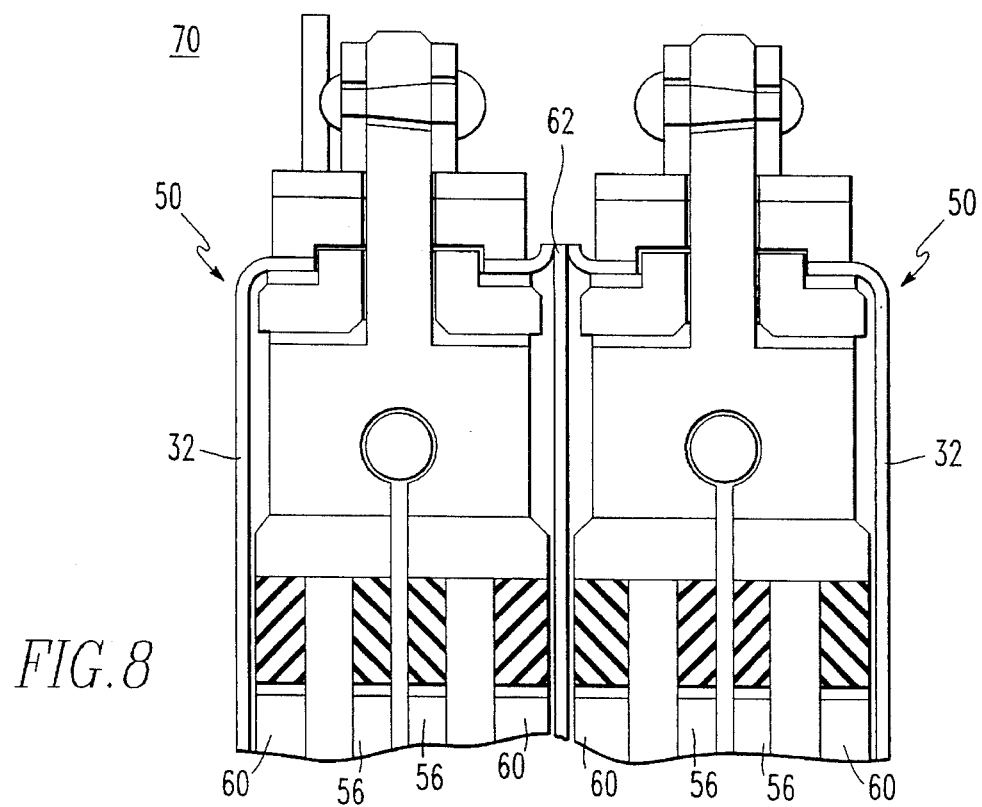
FIG. 8 is a schematic view of an alternative embodiment of the cell assembly case of the present invention.

Loading the cell case 30 from the side makes the parts interchangeable between a five-plate and a three-plate cell. FIG. 8 shows a cell assembly 70 in which two three plate cells 50 are placed side-by-side using the cover 62 of each cell case 30 as the center negative current collector. Such a cell assembly 70 is a five-plate cell. The flexibility in the width of such cells using case 30 is a distinct advantage over case 10 which is designed to a predetermined thickness and is unable to be expanded. In addition to the arrangement shown in FIG. 8, the three-plate cell assemblies 50 can be arranged such that the back side 32 of one case 30 serves as the cover to the opposing case.

The present side cover case 30 offers many advantages over the top cover case 10. Cell cases 10 can be manufactured with one or two slots where the flexible graphite or molybdenum tab of the positive current collectors pass through the cell case. The tabs are connected to the positive feed through on the outside of the cell case 10 and are sealed by an additional external cap. Problems may be encountered with this embodiment because the size of the sealing surfaces are small. Thus, there is a high probability of leaking at operating temperatures. The present cell case 30 overcomes this problem.

In addition, cell cases 10 can be manufactured having one or two slots where the flexible graphite or molybdenum tab of the positive current collectors pass through the cell can. Because the materials of the cell have different coefficients of thermal expansion, sealing on a flat tab with a non-flexible material has a high probability of leaking at operating temperatures. The present cell case 30 can overcome this problem.

Cell cases 10 can also be manufactured in two halves, with a single positive feedthrough wherein the feedthrough is provided through a welded area. Sealing on a welded surface with a non-flexible material presented a problem. This arrangement has a probability of leaking at operating temperatures. Because the top 34 of cell case 30 is a single piece, cell case 30 overcomes this problem.

During design evaluation, problems were identified in connection with the design of the cell assembly 50. A conductive track made by insertion of the flexible graphite was deposited on the side insulators when the positive current collector 54 was installed and resulted in shorting between the positive and negative electrodes. This shorting problem was prevented by increasing the clearance between the current collector 54 and the insulators.

It was found that with an all-flexible graphite current collector 54, the internal resistance of the cell assembly 52 was high, and the power output of the cell assembly 52 was reduced. Positive current collectors 54 having bonded-on flexible graphite framing elements 66 were hard to handle and fell apart during assembly. Accordingly, it is advisable to load the remaining elements 66 separately for the positive current collector 54.

In the foregoing specification certain preferred practices and embodiments of this invention have been set out, however, it will be understood that the invention may be otherwise embodied within the scope of the following claims.

We claim:

1. A lithium metal sulfide battery having a case within which at least one positive electrode and at least one negative electrode are provided, said case having a top, a bottom opposite said top, two ends and two sides, said sides having the largest dimensions in said case, said case comprising:

a) a first member comprising said top, said bottom, said two ends and one of said two sides, said first member being formed in a drawn form from a sheet of metal; and b) a cover comprising the other of said two sides, said cover being secured to said first member after said at least one positive electrode and at least one negative electrode are provided within said first member;

c) a terminal electrically connected to one of said electrodes, the other of said electrodes being electrically connected to said first member;

d) said top including an aperture therein;

e) said terminal extending through said aperture in said top and being electrically insulated from said first member.

2. The battery of claim 1 further comprising a second case within which at least one additional positive electrode and at least one additional negative electrode are provided, said second case having a top, a bottom opposite said top, two ends and two sides, said sides having the largest dimensions in said second case, said second case comprising a first member comprising said top, said bottom, said two ends and one of said two sides, said first member being formed in a drawn form from a sheet of metal; and wherein said first case and said second case share a common cover provided therebetween.

* * * * *